(12) United States Patent
Lee

(10) Patent No.: US 6,195,116 B1
(45) Date of Patent: Feb. 27, 2001

(54) MULTI-POINT VIDEO CONFERENCING SYSTEM AND METHOD FOR IMPLEMENTING THE SAME

(75) Inventor: Hee-jong Lee, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/182,209

(22) Filed: Oct. 30, 1998

(30) Foreign Application Priority Data

May 22, 1998 (KR) .................................................. 98-18536

(51) Int. Cl.[7] ....................................................... H04N 7/14
(52) U.S. Cl. ............................ 348/15; 348/16; 379/93.21
(58) Field of Search ................................ 348/14, 15, 16; 379/93.17, 93.21, 202

(56) References Cited

U.S. PATENT DOCUMENTS

| 5,446,491 | 8/1995 | Shibata et al. ......................... 348/15 |

FOREIGN PATENT DOCUMENTS

| 6-70040 | 3/1994 | (JP) | ................................. H04M/3/56 |
| 6-319130 | 11/1994 | (JP) | ................................. H04N/7/13 |
| 7-67035 | 3/1995 | (JP) | ................................. H04N/5/265 |
| 407067035 | * 5/1995 | (JP) | ................................. H04N/5/265 |
| 407250312 | * 9/1995 | (JP) | ................................. H04N/7/14 |
| 7-250312 | 9/1995 | (JP) | ................................. H04N/7/14 |
| 8-84331 | 3/1996 | (JP) | ................................. H04N/7/15 |
| 8-205115 | 8/1996 | (JP) | ................................. H04N/7/15 |
| 9-83987 | 3/1997 | (JP) | ................................. H04N/7/15 |

OTHER PUBLICATIONS

Japanese Abstract of 1–205673.
Japanese Abstract of 8–340521.

* cited by examiner

Primary Examiner—Curtis A. Kuntz
Assistant Examiner—Melur Ramakrishnaiah
(74) Attorney, Agent, or Firm—Sughrue, Mion, Zinn, Macpeak & Seas, PLLC

(57) ABSTRACT

A video conference system includes terminals where each terminal extracts only an object image from a picture that includes an object and a background. The extracted object image signal is transmitted to a controller to be synthesized on a background image, and a synthesized image is simultaneously transmitted to a plurality of terminals. Each of the plurality of terminals encodes only an object image signal corresponding to a conference participant out of a photographed video signal to output an encoded object signal. Each terminal receives and decodes a compression-encoded image signal to display a compressed image. A multi-point controller receives and decodes the encoded object signals from the plurality of terminals to restore object images, adjusts the size of the object images, synthesizes a background image with the size-adjusted object images, and compression-encodes the synthesized image to output the compression-encoded image signal to the plurality of terminals.

16 Claims, 4 Drawing Sheets

MULTI-POINT VIDEO CONFERENCING SYSTEM AND METHOD FOR IMPLEMENTING THE SAME

BACKGROUND OF THE INVENTION

1. Field of the Invention

The present invention relates to a video conferencing system, and more particularly, to a multi-point video conferencing system which improves the method for placing plural images transmitted from plural users separated geographically on the display of each terminal.

2. Description of the Related Art

FIG. 1 is a schematic diagram of a conventional multi-point video conferencing system. The system of FIG. 1 is disclosed in U.S. Pat. No. 5,446,491 issued Aug. 29, 1995 to Shinbata et al. and entitled "Multi-point Video Conference System" wherein each terminal comprises a shared frame memory to store information from other terminals.

The video conferencing system shown in FIG. 1 includes a plurality of terminals for motion picture conferencing 10a through 10d, and a communications network 12 for transmitting and switching encoded motion picture data from the terminals 10a through 10d. Here, each of the terminals 10a through 10d have the same configuration.

FIG. 2 is a detailed block diagram of one of the terminals 10a through 10d shown in FIG. 1. Each terminal includes a video camera 102, an encoder 104, a multi-point decoder 106, and a display 108.

The encoder 104 encodes and packetizes the motion picture signals output by the video camera 102 in units of blocks. The multi-point decoder 106 restores the packets received from the other terminals through the communications network 12 into the original motion pictures. The display 108 displays the data transmitted from the multi-point decoder 106.

In particular, the multi-point decoder 106 includes an image processor, a channel selection controller, a shared frame memory and a display memory. The image processor processes an input image in a time divisional multiplexing scheme. The channel selection controller determines the transmission point of received packets according to the information of the received packets and notifies the image processor of the transmission point. The shared frame memory stores information of a plurality of images transmitted from the plurality of terminals. The display memory synchronously outputs video information stored in the shared frame memory.

The conventional multi-point video conferencing system having the aforementioned configuration is constructed to operate the multi-point video decoder in a time divisional multiplexing scheme to display information of a plurality of compressed images received from different terminals on a display device. In such a configuration, as the number of terminals involved in the video conference system increases, the amount of data to be calculated in a processor incorporated in the multi-point video decoder increases accordingly. Thus, to complete decoding within a limited time, the calculating capacity of the processor must be enhanced, which increases costs of the system.

SUMMARY OF THE INVENTION

To solve the above problems, one object of the present invention is to provide a video conference system in which terminals extract only an object image from a picture including the object image and non-object features, such as a background. The extracted object image is transmitted to a controller to be synthesized with a background image, and a synthesized image is simultaneously transmitted to a plurality of terminals.

Another object of the present invention is to provide a method for implementing the video conference system.

In order to achieve one of the above objects, in a multi-point video conferencing system according to the present invention, each of a plurality of terminals encodes only an object image signal out of a photographed video signal, which includes the object image signal and a background signal, to output an encoded object signal, and receives and decodes a compression-encoded image signal to display a compressed image. A multi-point controller receives and decodes the encoded object signals from the plurality of terminals to restore object images, adjusts the size of the object images, synthesizes a background image with the size-adjusted object images, and compression-encodes the synthesized image to output the compression-encoded image signal to the plurality of terminals.

In order to achieve another one of the above objects, there is provided a method for implementing a multi-point video conferencing system having a plurality of terminals for a video conference and a multi-point controller for controlling data communications between the plurality of terminals. The method comprises the steps of: (a) separating a background image and an object image from a photographed picture; (b) compression-encoding only the object image to transmit an encoded object image signal; (c) decoding the encoded object image signal to reconstruct the object image; (d) adjusting the size of the reconstructed object image; (e) generating a background image; (f) synthesizing the background image with the reconstructed object images; (g) compression-encoding a synthesized image and simultaneously transmitting the same to the plurality of terminals; and (h) reconstructing and displaying the transmitted synthesized image.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENTS

Figure 1:
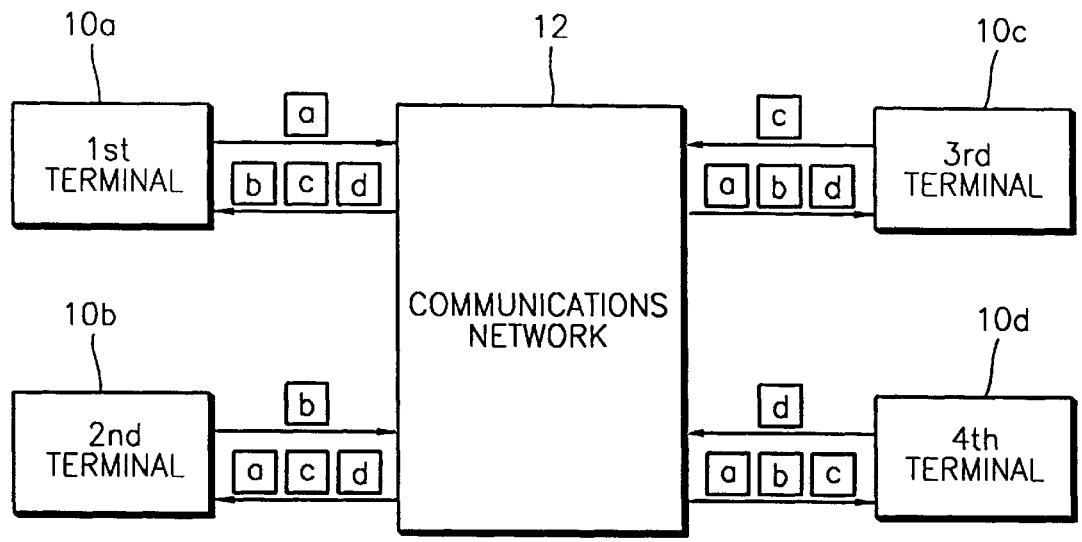
FIG. 1 is a schematic diagram illustrating a conventional multi-point video conferencing system.
Figure 2:
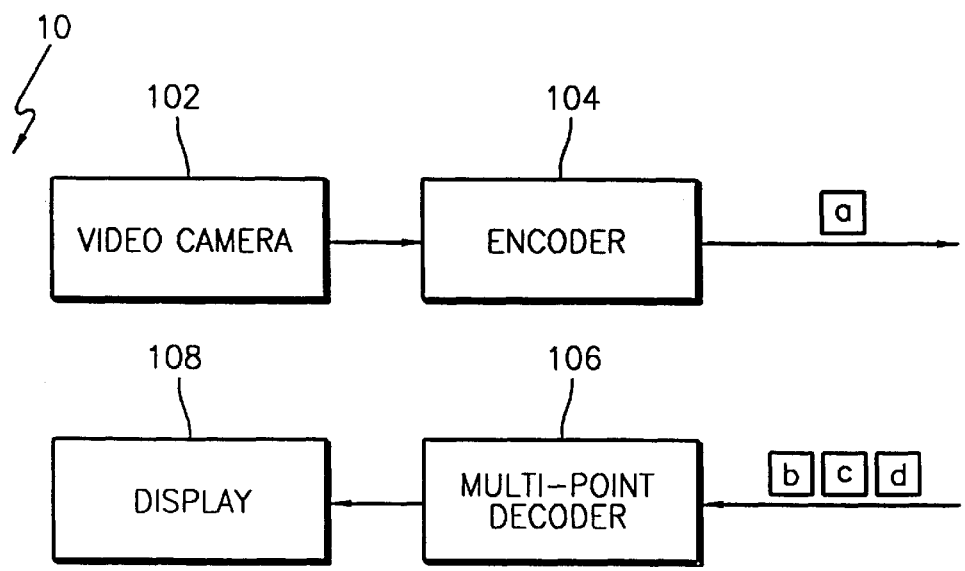
FIG. 2 is a detailed block diagram illustrating one of the terminals shown in FIG. 1.
Figure 3:
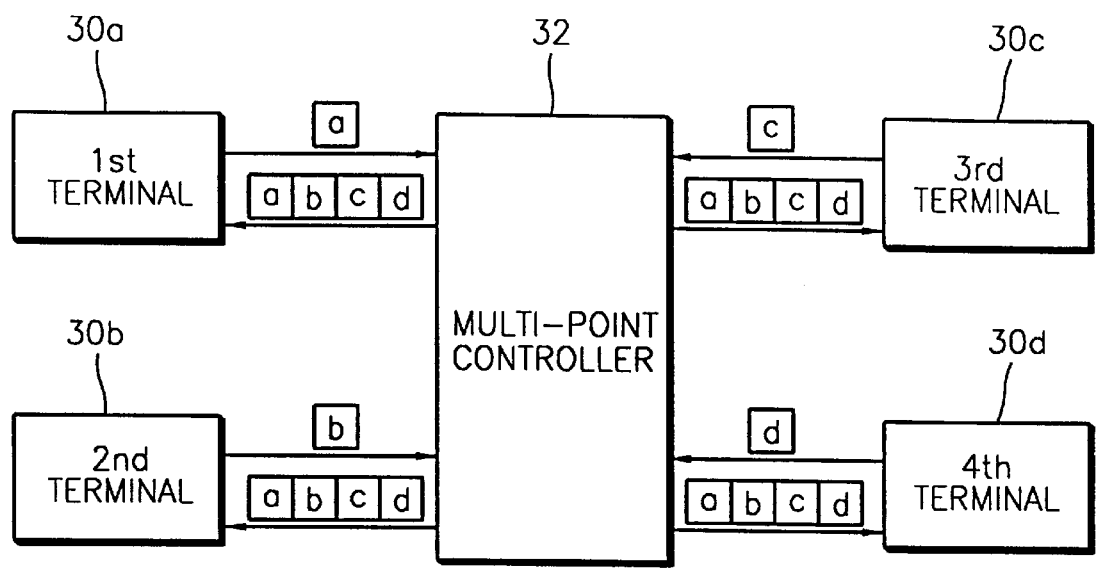
FIG. 3 is a schematic diagram illustrating a multi-point video conferencing system according to the present invention.

Referring to FIG. 3, a multi-point video conferencing system according to the present invention includes a plurality of terminals 30a through 30d and a multi-point controller 32.

Each of the terminals 30a through 30d, having the same configuration with one another, encodes only certain objects of a photographed picture by removing a background image and other non-object images from the photographed picture and transmits the encoded image signal to the multi-point controller 32. The object to be encoded may correspond to a conference participant. Also, each of the terminals 30a through 30d receives a synthesized image signal and decodes such signal to display a superimposed image. As described below, the synthesized image signal is a signal resulting from superimposing object image signals from the plurality of terminals 30a through 30d with a background image signal.

The multi-point controller 32 receives and decodes encoded object image signals from the terminals 30a through 30d, adjusts the size of each object image according to the number of participants participating in the video conferencing, synthesizes the size-adjusted object images and the separately generated background image, and compression-encodes the synthesized data to simultaneously transmit the compression-encoded images to the terminals 30a through 30d. In the present embodiment, the multi-point controller 32 is constructed using a part of a network by a public service communication network operator. However, in an alternative embodiment of the present invention, the multi-point controller 32 may be implemented by hardware separate from the equipment of the network operator.

In FIG. 3, four terminals are connected to the multi-point controller 32. In an alternative embodiment, however, more or fewer terminals may be connected to the multi-point controller 32.

Figure 4:
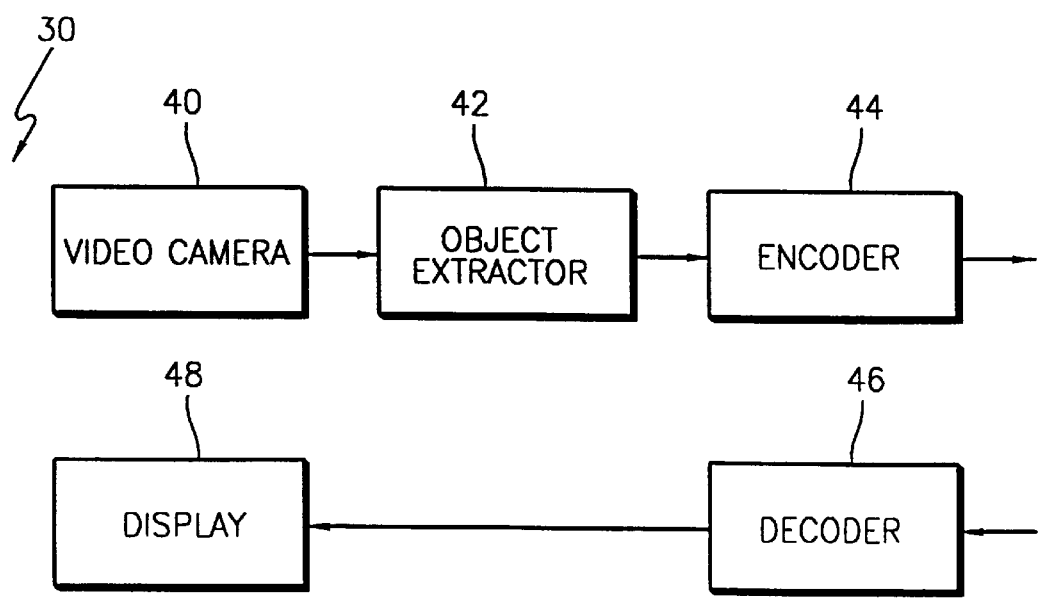
FIG. 4 is a detailed block diagram illustrating one of the terminals shown in FIG. 3.

FIG. 4 is a detailed block diagram of one of the terminals shown in FIG. 3. Each terminal includes a video camera 40, an object extractor 42, an encoder 44, a decoder 46, and a display 48. The object extractor 42 removes the background image signal and other unwanted image signals from the video signal output by the video camera 40, thereby extracting only the desired object image signal. The encoder 44 encodes the object image signal output by the object extractor 42 in units of blocks and packetizes the encoded image signal. The decoder 46 decodes the synthesized image signal in order to restore the superimposed image, in which a plurality of object images is superimposed on a background image, transmitted from the multi-point controller 32. The display 48 displays the video signal output by the decoder 46.

Figure 5:
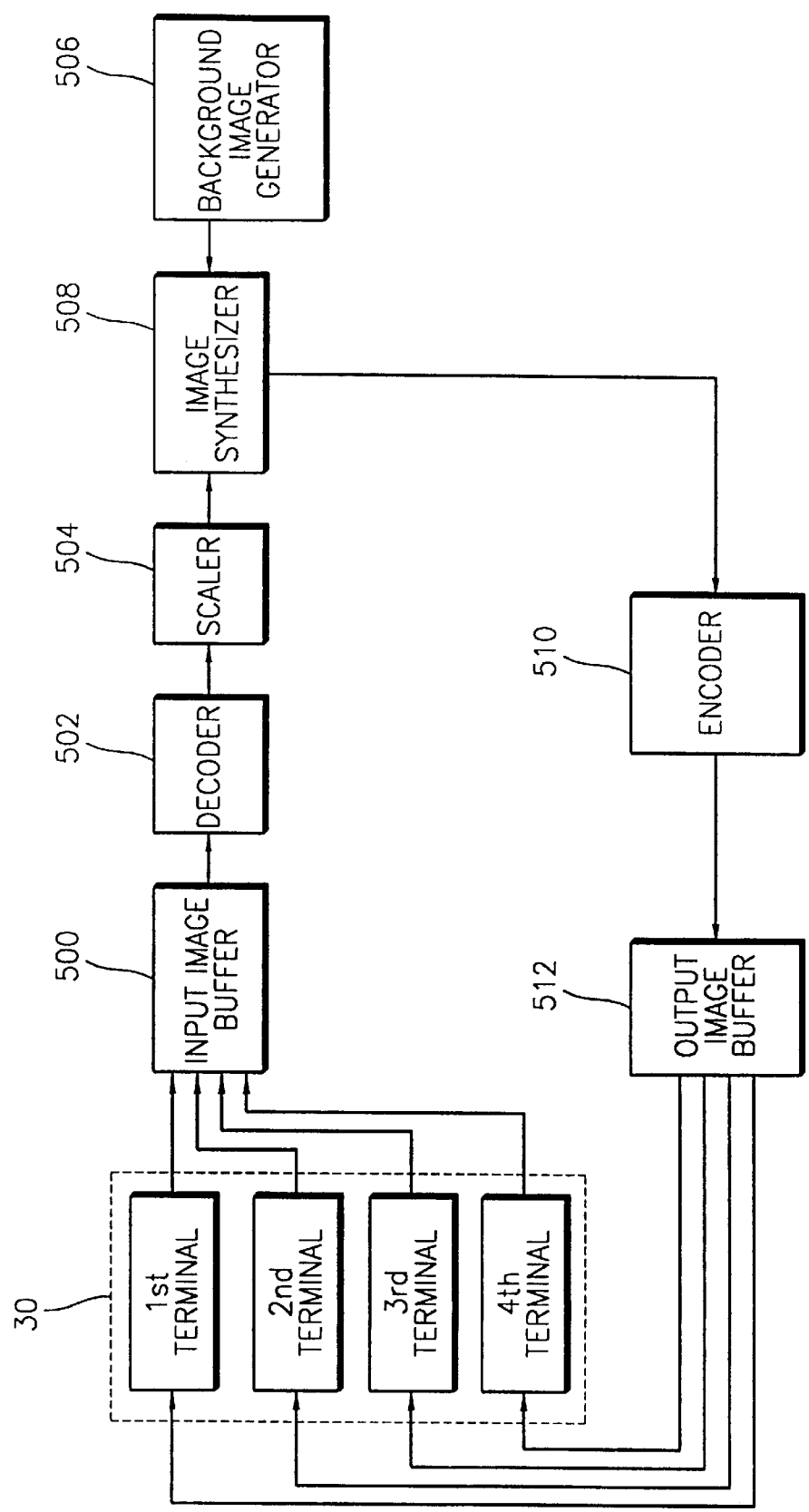
FIG. 5 is a detailed block diagram illustrating the multi-point controller shown in FIG. 3.

FIG. 5 is a detailed block diagram of the multi-point controller shown in FIG. 3. The multi-point controller includes an input image buffer 500, a decoder 502, a scaler 504, a background image generator 506, an image synthesizer 508, an encoder 510, and an output image buffer 512.

The decoder 502 decodes the object images output by the terminals 30a through 30d. The scaler 504 adjusts the size of the object images output by the decoder 502 according to the number of participants participating in the video conference. The background image generator 506 generates a background image. In the present embodiment, the background image is generated by the multi-point controller 32 in order to simplify the configuration of the terminals. However, the background image may be generated by each terminal in an alternative embodiment.

The image synthesizer 508 synthesizes the object images output by the scaler 504 and the background image output by the background image generator 506. In other words, the object images whose sizes are converted by the scaler 504 are synthesized into a single image by a certain image synthesizing procedure. The image synthesizing procedure follows a set of prescribed rules for synthesizing object images transmitted from the respective terminals. The object images may be arranged in rows or a matrix or according to other prescribed sequences or rules for arranging the object images. The images are synthesized such that the object images are superimposed over the background image generated from the background image generator 506. The information of the synthesized images is constructed such that the object images of all participants are arranged in parallel on a screen.

The encoder 510 encodes the synthesized image signal output by the image synthesizer 508. In other words, the synthesized image information is compressed in the encoder 510 and transmitted to the terminals 30a through 30d via the image output buffer 512 so that the compressed images are reconstructed in the decoder of each terminal to then be displayed on a display.

Figure 6:
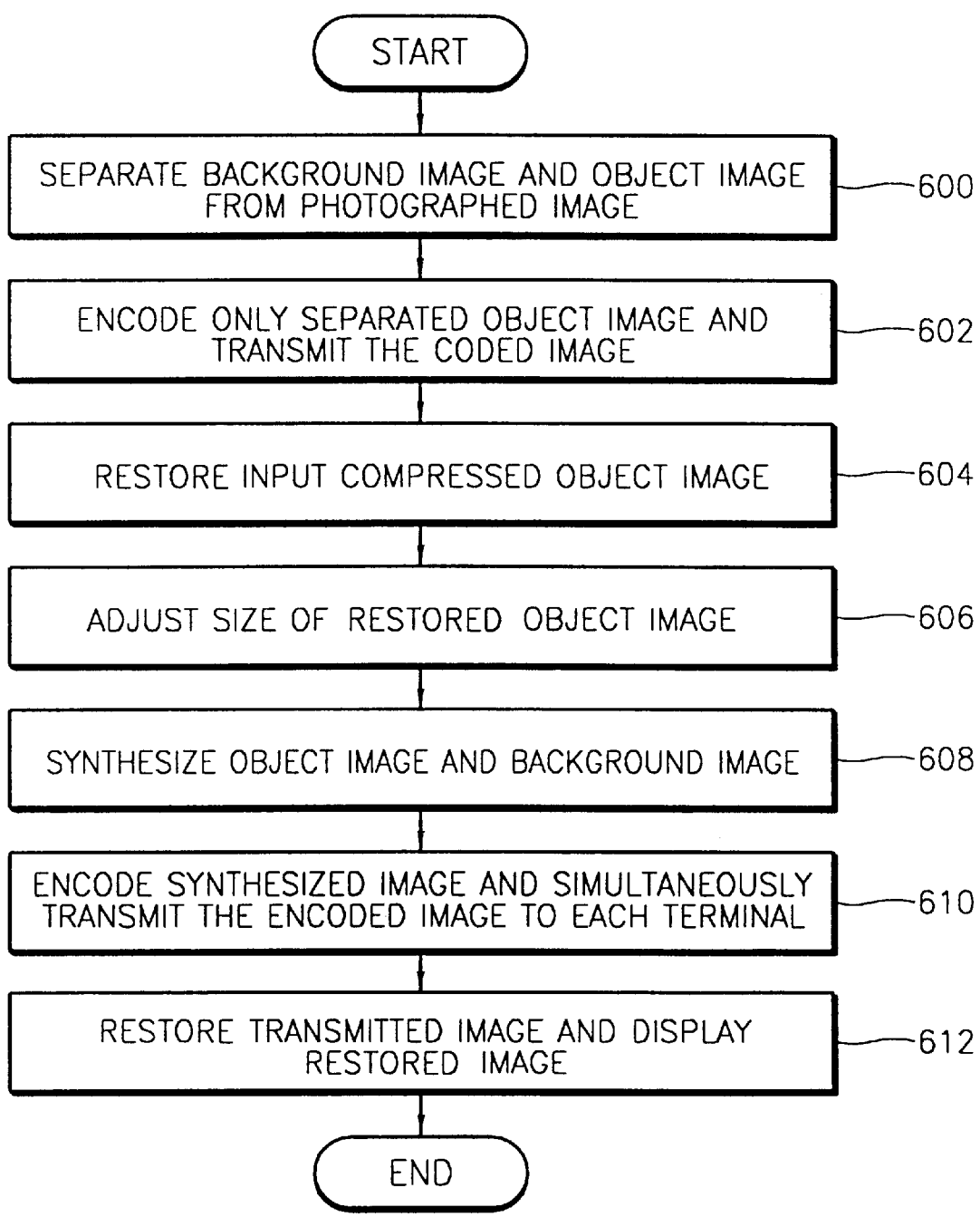
FIG. 6 is a flow chart for explaining a method for implementing the multi-point video conferencing system according to the present invention.

FIG. 6 is a flow chart for explaining a method for implementing the multi-point conference system. Steps 600, 602 denote an encoding process at each terminal, step 612 denotes a decoding process at each terminal, and steps 604 and 610 denote processes performed by a multi-point controller.

First, a background image and object images are separated from a photographed image (step 600). The object images, that is, the images of the conference participants are extracted by the object extractor 42 such that the background image is removed from the photographed image of a video camera. Only the object images are compression-encoded by the encoder 44 to then be transmitted to the multi-point controller 32 (step 602).

The object images transmitted from the respective terminals via the input image buffer 500 of the multi-point controller 32 are reconstructed into the original object images in the decoder 502 (step 604).

The sizes of the object images reconstructed in the decoder 502 are adjusted (step 606). The sizes of the reconstructed object images are adjusted by the scaler 504 according to the number of conference participants so that the size of each object image increases or decreases to display all the participant images on a screen.

The object images and the background image are synthesized (step 608). The object images output by the scaler 504 and the background image output by the background image generator 506 are synthesized by the image synthesizer 508. In this case, the synthesis of the object images and the background image is performed by the prescribed arrangement sequence or rules of the object images such that the object images are superimposed over the background image.

The synthesized image is compression-encoded to then be transmitted to the respective terminals simultaneously (step 610). The image synthesized by the image synthesizer 508 is compression-encoded by the encoder 510 and the compression-encoded image is simultaneously transmitted to the respective terminals via the output image buffer 512.

The transmitted image is reconstructed and displayed (step 612). The image transmitted to the respective terminals is reconstructed by the decoder 46 provided in each terminal and displayed on the display 48.

As described above, according to the present invention, the sizes of the object images to be transmitted from a multi-point controller to the terminals are adjusted to be encoded to be capable of displaying the object images on a single screen. Thus, even if the number of terminals involved in the video conference increases, the image information to be reconstructed by a decoder of each terminal does not increase considerably. Therefore, compared to the conventional case, since it is not necessary to employ a decoder with an improved calculating capacity, the costs of the terminals need not increase.

What is claimed is:

1. A multi-point video conferencing system comprising:
    a plurality of terminals, each terminal encoding only an object image signal out of a photographed video signal, which includes the object image signal and a background signal, to output an encoded object signal, each terminal further receiving and decoding a compression-encoded image signal to display a compressed image; and
    a multi-point controller operable to receive and decode the encoded object signals from each of said plurality of terminals to restore object images, said multi-point controller adjusting the size of the object images, synthesizing a background image and all of the size-adjusted object images to form a single synthesized composite image, and compression-encoding the single synthesized composite image to output the compression-encoded image signal to said plurality of terminals.

2. The multi-point video conferencing system according to claim 1, wherein each of said plurality of terminals comprises:
    a video camera producing the photographed video signal;
    an object extractor for extracting the object image signal from the photographed video signal output by said video camera;
    an encoder for encoding and packetizing the object image signal from said object extractor in units of blocks;
    a decoder for producing a synthesized image signal by decoding the compression-encoded image signal from said multi-point controller; and
    a display for displaying an image in accordance with the synthesized image signal output by the decoder.

3. The multi-point video conferencing system according to claim 1, wherein said multi-point controller comprises:
    a decoder for decoding the encoded object signal output by each of said plurality of terminals and outputting a corresponding reconstructed image signal for each respective terminal;
    a scaler for adjusting the size of each reconstructed image signal to output a size-adjusted object image signal;
    a background image generator for generating a background image;
    an image synthesizer for synthesizing a plurality of size-adjusted object image signals output by said scaler with the background image output by said background image generator, to form said single synthesized composite image; and
    an encoder for compression-encoding the single synthesized composite image output by said image synthesizer to output the compression-encoded image signal.

4. The multi-point video conferencing system according to claim 3, wherein said scaler adjusts the sizes of the reconstructed image signals according to a number of participants participating in a video conference.

5. The multi-point video conferencing system according to claim 3, wherein said background generator generates a single background image on which the plurality of size-adjusted object image signals are superimposed.

6. The multi-point video conferencing system according to claim 3, wherein said image synthesizer synthesizes the size-adjusted object image signals with the background image according to a predetermined rule of arranging the object images.

7. The multi-point video conferencing system according to claim 6, wherein the size-adjusted object image signals are arranged in parallel rows over the background image.

8. The multi-point video conferencing system according to claim 6, wherein the size-adjusted object image signals are displayed on a single screen.

9. The multi-point video conferencing system according to claim 3, wherein the compression-encoded image signal is transmitted simultaneously to said plurality of terminals.

10. The multi-point video conferencing system according to claim 1, wherein the object image signal corresponds to an image of the conference participant.

11. A method for implementing a multi-point video conferencing system, having a plurality of terminals for a video conference and a multi-point controller for controlling data communications between the plurality of terminals, said method comprises the steps of:
    (a) separating a background image and an object image from a photographed picture;
    (b) compression-encoding only the object image to transmit an encoded object image signal;
    (c) decoding the encoded object image signal to reconstruct the object image;
    (d) adjusting the size of the reconstructed object image to form a size-adjusted object image;
    (e) generating a background image;
    (f) synthesizing the background image with the size-adjusted object image and other size-adjusted object images that correspond to others of said plurality of terminals, to form a single synthesized composite image;
    (g) compression-encoding said single synthesized composite image and transmitting the same simultaneously to the plurality of terminals; and
    (h) reconstructing and displaying the transmitted image.

12. The method according to claim 11, wherein, in said step (d), the size of the reconstructed object image is adjusted according to the number of conference participants.

13. The method according to claim 11, wherein, in said step (e), a single background, over which the reconstructed object image will be superimposed, is generated.

14. The method according to claim 11, wherein, in said step (f), the object images of all video conference participants are superimposed over the background image.

15. The method according to claim 11, wherein, in said step (h), the transmitted image is simultaneously reconstructed and displayed.

16. A multi-point video conferencing system comprising:
    a plurality of terminals, each terminal encoding only an object image signal out of a photographed video signal to output an encoded object signal, each terminal further receiving and decoding a compression-encoded image signal, and synthesizing a background image with the decoded image signal to display a compressed image; and
    a multi-point controller for receiving and decoding the encoded object signals from said plurality of terminals to restore object images, adjusting the size of the restored object images, synthesizing the size-adjusted object images with each other to form a single synthesized composite image signal, and compression-encoding the single synthesized composite image signal to output the compression-encoded single synthesized composite image signal to said plurality of terminals.

* * * * *